United States Patent [19]

Letorey et al.

[11] Patent Number: 5,521,445
[45] Date of Patent: May 28, 1996

[54] DEVICE FOR ADMINISTERING TIMED ORDERS FOR THE REMOTE CONTROL OF ELECTRICAL APPARATUS

[75] Inventors: Joseph A. P. M. Letorey, Varaville; Vital A. Parise, Douvres La Delivrance, both of France

[73] Assignee: Moulinex S.A., Bagnolet, France

[21] Appl. No.: 195,457

[22] Filed: Feb. 14, 1994

[30] Foreign Application Priority Data

Feb. 12, 1993 [FR] France .................................. 93 01626

[51] Int. Cl.$^6$ ........................................................ H01H 9/54
[52] U.S. Cl. .............................. 307/139; 307/41; 307/36; 364/492; 340/825.21; 340/526
[58] Field of Search ................................ 307/139, 41, 36; 364/492; 340/825.01, 825.02, 825.03, 825.22, 825.27, 520, 825.07

[56] References Cited

U.S. PATENT DOCUMENTS

| | | | |
|---|---|---|---|
| 4,279,012 | 7/1981 | Beckendorf | 364/104 |
| 4,301,515 | 11/1981 | Fahey et al. | 364/900 |
| 4,418,333 | 11/1983 | Schwarzback et al. | 340/310 |
| 4,922,407 | 5/1990 | Birk et al. | 364/145 |
| 5,160,853 | 11/1992 | Simon et al. | |

FOREIGN PATENT DOCUMENTS

| | | |
|---|---|---|
| 0369430 | 5/1990 | European Pat. Off. . |
| 0424772 | 5/1991 | European Pat. Off. . |
| 2462740 | 2/1981 | France . |

*Primary Examiner*—William M. Shoop, Jr.
*Assistant Examiner*—Albert Paladini
*Attorney, Agent, or Firm*—Young & Thompson

[57] ABSTRACT

Device and method for administering timed orders for the remote control of apparatus, comprising a clock (4) adapted to mark the time, an adjuster (5) for the clock, a programmer (6) permitting selecting an absolute wake up time, a comparator (7) for comparing the clock time and the absolute time, and a control (10) which can have either an active condition in which it sends information for starting the apparatus and to which it is brought by the coincidence of the clock time with the absolute time, or an inactive condition in which it authorizes no operation of the apparatus in the absence of such coincidence. The control (10) is subordinated to a corrector (11 ) for the absolute time which retards or advances a predetermined time relative to the selected absolute time so as to fix a relative time. The control (10) then passes to its active condition at this relative time. The programmer (6) comprises an automatic device (12) for positioning the relative time with respect to the programmed absolute time.

5 Claims, 1 Drawing Sheet

DEVICE FOR ADMINISTERING TIMED ORDERS FOR THE REMOTE CONTROL OF ELECTRICAL APPARATUS

BACKGROUND OF THE INVENTION

1. Field of the Invention

The invention relates to a device for administering timed orders for the remote control of electrical apparatus and comprises a clock adapted to mark the time, means for adjusting the clock, programming means permitting selecting an absolute time, for example, of awakening, means for comparing the clock time and the programmed absolute time, and ordering means which can take either an active condition in which it sends information for the actuation of at least one apparatus and to which it is brought by the comparison means upon correspondence of the clock time with the absolute time, or an inactive condition in which it permits no operation of the apparatus in the absence of correspondence of the clock time and the absolute time.

2. Description of the Related Art

The known devices of this type thus permit remotely controlling the operation of apparatus according to a sequence predetermined by the user and this with respect to an absolute time selected by this user. Thus, by way of example, there can be mentioned a program for starting an electric coffee maker at 7:00 a.m., and a wake up call at 7:10 a.m., followed by preheating the bathroom at 7:20 a.m.

Unfortunately, if the user wishes to change his wake up time, he must also change the programming of the coffee maker and the preheating. It will be understood that these multiple programmings are difficult and time consuming and render the ordering device inconvenient to use, as they may give rise to errors in the control of the apparatus.

SUMMARY OF THE INVENTION

The invention therefore has for its object to overcome these drawbacks by automating the device for administering timed orders.

According to the invention, the device is characterized in that the ordering means is subordinated to a correction means for the absolute time which retards or advances a predetermined time relative to said chosen absolute time so as to fix a relative time, said ordering means then passing to its active condition at this relative time, and in that the programming means comprises automatic means for positioning the relative time with respect to the programmed absolute time.

Thanks to these positioning means, it will be understood that if the user changes the programming of the absolute time, for example of his wake up call, the relative time will be automatically adjusted relative to the selected absolute new time and this without error in the ordering of the apparatus.

According to another aspect of the invention, the administering device for timed orders uses a process in which the following operations are effectuated:

programming of an absolute time, for example, a wake up call;

programming of a relative time with respect to the absolute time;

automatic positioning of the relative time on the programmed absolute time;

comparison of the clock time to the relative time;

ordering of the operation of the apparatus.

Thus, with such a process, there is obtained a simple and reliable programming.

BRIEF DESCRIPTION OF THE DRAWINGS

The characteristics, details and advantages of the invention will become further apparent from the description which follows, by way of example, with reference to the accompanying drawing, in which.

DESCRIPTION OF THE PREFERRED EMBODIMENTS

Figure 1:
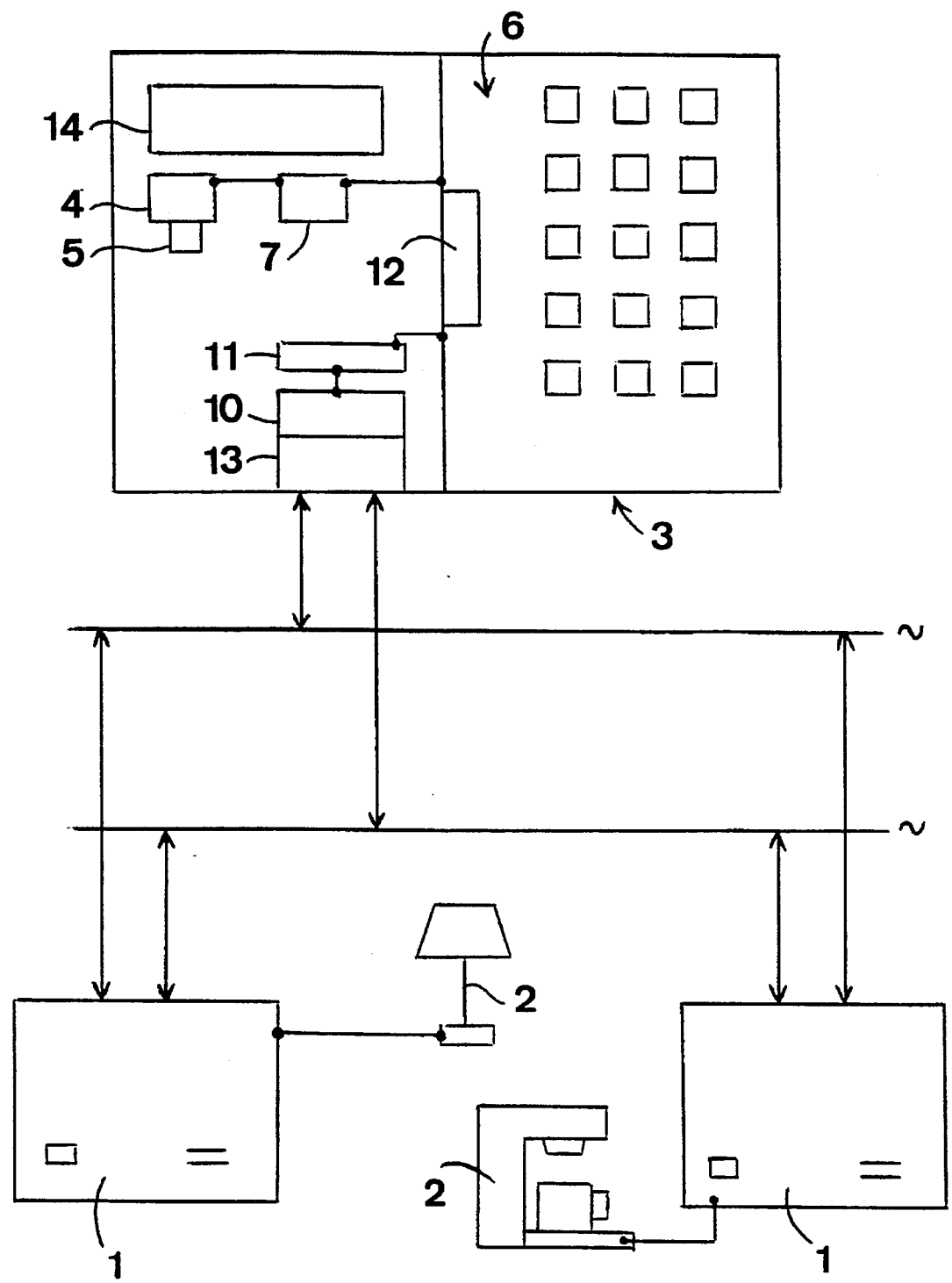
FIG. 1 is a simplified schematic view illustrating the different means comprising the device for administering timed orders according to the invention and applied to a household installation.

The device for administering timed orders for the control apparatus is, for example, applied to a household installation in which there are used carrier currents for the transmission of information between emitter-receivers called slaves 1 adapted control the electrical apparatus 2 and at least one master control 3 comprising the device which includes for this purpose a clock 4 adapted to mark the time, an adjustment means 5 for the clock, programming means 6 permitting selecting an absolute wake up time, means 7 for effecting a comparison between the clock time and the absolute time, and control means 10 which can have either an active state in which it sends information for starting the apparatus 2 and to which it is brought by the coincidence of the clock time with the absolute time, or an inactive state in which it authorizes no operation of the apparatus 2 in the absence of such coincidence.

According to the invention, the control means 10 is subordinated to a correction means 11 for the absolute time which retards or advances the time determined with respect to the said selected absolute time so as to fix a relative time, said control means 10 then passing to its active state at this relative time, and the programming means 6 comprising automatic means 12 for positioning the relative time with respect to the programmed absolute time.

According to a preferred embodiment of the invention, the programming means 6 comprises a first microcontroller including a RAM memory for storage of the absolute wake up time and of the relative time and a permanent memory of the EEPROM type for example, and comprising the correction means 11, the comparison means 7, the control means 10 having an interface 13 for communication with the apparatus, and a second microcontroller comprising the clock 4 and the adjustment means 5.

To permit the transmission of information between the two microcontrollers, there is used a bus of the type 12C. These microcontrollers adapted to this processing of data, of information and of orders are, for example, of the family 8051 of the company PHILIPS, reference 652.

By way of example, there will now be described hereinafter the use of the administration device for means of the process according to the invention.

According to a first hypothesis, the user desires to use the device to program with the aid of a keyboard 14, for example, the operation of an electric coffeemaker 2 five minutes before the absolute wake up time, and the operation of a bathroom radiator 20 minutes after said wake up time.

To do that, there are carried out the following operations:

programming of an absolute wake up time;

programming by correction means 11 of relative time with respect to the absolute time, which is to say minus five minutes and plus 20 minutes;

automatic positioning of the selected relative time against the absolute wake up time;

comparison of the clock time to the selected relative time;

and control of the operation of the apparatus with respect to said relative time, which is to say starting the coffeemaker 2 five minutes before the wake up time and starting the radiator 20 minutes after the wake up time.

According to a second hypothesis, the user desires, having kept the first hypothesis, to modify the absolute wake up time as a function of the days of the week. To do that, he programs day-by-day by programming means 6 a new absolute wake up time. Thanks to the automatic positioning means, the relative time (which is to say in the present case the absolute time less five minutes and plus 20 minutes) adapts itself to each new absolute new wake up time in a precise manner and can thus start the control of the operation of the apparatus according to the definite program.

The invention is applicable for example to household networks such as those described in French patent No. 91 00479 of the applicant.

Modifications of the invention herein disclosed will occur to a person skilled in the art and all such modifications are deemed to be within the scope of this invention as defined by the appended claims.

What is claimed is:

1. In a device for administering timed orders for the remote control of apparatus, comprising a clock (4) adapted to mark the time, adjusting means (5) for adjusting a clock time on the clock, programming means (6) permitting selecting an absolute wake up time, comparison means (7) for comparing the clock time and the absolute wake up time, and control means (10) for controlling said apparatus to assume one of an active condition in which it sends information for starting the apparatus and to which it is brought by the coincidence of the clock time with the absolute wake up time, and an inactive condition in which it authorizes no operation of the apparatus in the absence of such coincidence; the improvement wherein the control means (10) is subordinated to a correction means (11) for correcting the absolute wake up time, said correction means (11) one of retards and advances a predetermined time relative to said selected absolute wake up time so as to fix a relative time, said control means (10) then passing to its active condition at this relative time, and the programming means (6) comprises automatic means (12) for automatically positioning the relative time with respect to the programmed absolute wake up time, said automatic means automatically adjusting the relative time with respect to the programmed absolute wake up time when a user modifies said absolute wake up time.

2. Device according to claim 1, wherein the programming means (6) comprises a first microcontroller containing a RAM memory for the storage of the absolute wake up time and of the relative time and a permanent memory comprising the correction means (11), the automatic positioning means. (12), the comparison means (7), and the control means (10) provided with an interface (13) for communication with the apparatus, as well as a second microcontroller comprising the clock (4) and the adjustment means (5).

3. Device according to claim 2, wherein the connection between the two microcontrollers is effectuated by means of a bus of the type 12C.

4. In a process for administering timed orders for the remote control of apparatus, in which there is utilized a clock (4) adapted to mark the time, adjustment means (5) for the clock, programming means (6) permitting selecting an absolute wake up time, comparison means (7) between the clock time and the absolute time, and control means (10) of said apparatus as a function of the result of the comparison made by the comparison means; the improvement comprising the following operations:

programming an absolute time;

programming a relative time with respect to the absolute time;

automatically positioning the relative time on the programmed absolute time;

comparing the clock time to the relative time;

and controlling the operation of the apparatus with respect to said relative time.

5. Process according to claim 4, applied to a domestic installation in which there are used carrier currents for the transmission of data between emitter-receivers (1) in the form of slaves adapted to control the electric apparatus (2) and at least one master control (3) comprising the clock (4), the adjustment means (5), the programming means (6), the comparison means (7), the control means (10), the correction means (11) and the automatic means (12) for positioning the relative time with respect to the absolute time.

\* \* \* \* \*